Jan. 31, 1928.
J. A. MILLER
1,657,580
APPARATUS FOR REMOVING HIGH BAKE ENAMEL
Filed April 17, 1924
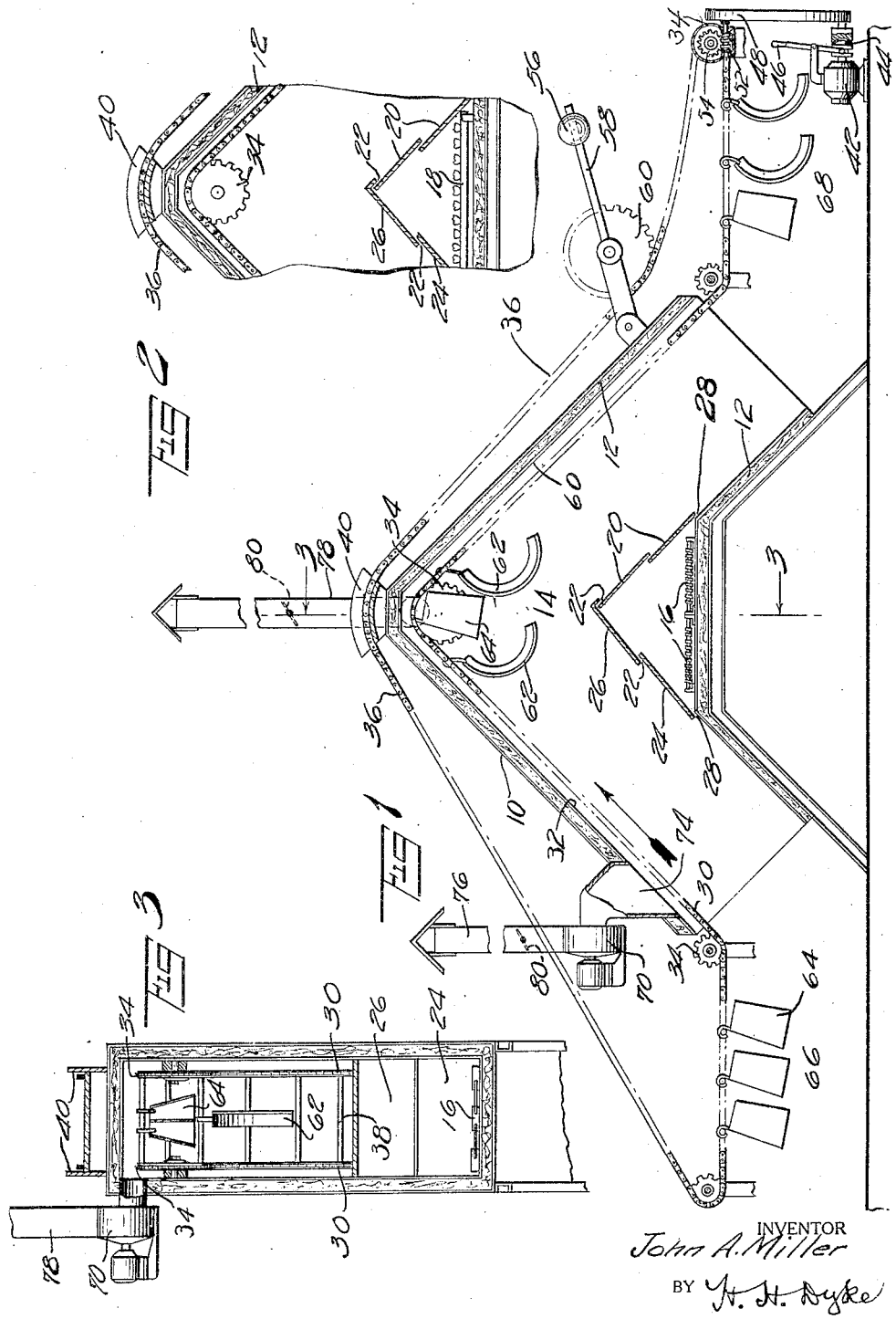
INVENTOR
John A. Miller
BY H. H. Dyke
ATTORNEY Patented Jan. 31, 1928.

UNITED STATES PATENT OFFICE.

1,657,580

JOHN A. MILLER, OF TARRYTOWN, NEW YORK.

APPARATUS FOR REMOVING HIGH-BAKE ENAMEL.

Application filed April 17, 1924. Serial No. 707,109.

My invention relates to apparatus for removing high bake enamel from metallic articles.

To get a highly resistant, wear-resisting surface on metallic automobile parts, such as fenders, engine hoods and the like, enamel is baked thereon at relatively high temperatures, say about 300° F. to 450° F.

When it becomes necessary to renew such enamel for any cause, whether because of defects occurring in the enameling process so that the part will not pass inspection, or whether the enamel has become scratched or injured from any cause, the high resistant qualities of such baked on enamels become almost a defect in that the removal thereof, which must be effected preparatory to re-enameling, is very difficult, highly expensive, and time consuming.

Such enamel can be cheaply and readily removed by subjecting the metallic enameled part to a sufficiently high temperature, say about 1000° F., for a period of time in the neighborhood of 20 minutes, in about which time the enamel is substantially entirely burned off and disintegrated, so that such residue as may remain on the surface is weak and of disintegrated character and can be readily removed as by a scratch brush, and the like.

The accompanying drawing illustrates an apparatus for burning off the enamel, which has been baked on the metallic parts at high temperatures. In said drawings, Fig. 1 is a longitudinal section of an apparatus comprising an electrical heater. Fig. 2 is a fragmentary detail view showing the use of a flame heater, as a gas or oil heater, and Fig. 3 is a transverse section on line 3—3, Fig. 1.

Reference character 10 represents generally a burning off oven of A type or inverted V type, which is heavily insulated as indicated at 12, so as to reduce the dissipation of heat to a minimum and to withstand temperatures in the neighborhood of 1000° F. Heat is supplied at substantially the highest part 14 of the oven 10 from beneath, as, for example, by electric heaters 16 (Fig. 1), or by gas or oil burners 18 (Fig. 2). Due to the tendency of heated air to rise, this elevated portion of the oven forms substantially an air pocket for the highly heated air. Baffle plates or heater guards 20 are placed over the heaters and serve to prevent the enamel being burned off from running directly on to the heating devices and these guards or baffles 20 are provided with openings 22 for the upward passage of the heated air. A desirable way of forming the openings 22 to permit the upward passage of the air, and at the same time to protect the heaters from molten enamel and the like, which may run down thereon, is by forming same of metallic plates 24, 26, the upper plate 26 overlapping the lower plate 24, with openings 22 provided therebetween. Inlet openings 28 are similarly provided for admitting air to the burners or other heating devices.

A conveyor chain 30 traverses the oven 10 along the upper wall 32 thereof and is suitably supported as by the conveyor sheaves 34. The conveyor chain 30 is preferably returned outside the oven and preferably over the oven, as indicated at 36. A single chain conveyor may be used and when a two chain conveyor is used the chains are cross-connected by cross-bars 38. The return part may run on sheaves or may slide over the top of the oven in slides 40.

Means are provided for driving the conveyor chain 30, as, for example, an electric motor or equivalent driving device 42 may be utilized for this purpose and same is preferably arranged so that the conveyor can be operated intermittently, and in the form shown a clutch 44, operated by a lever 46, is provided for such purpose and the drive is through the belt 48, worm 52 and worm gear 54 driving one of the conveyor sheaves or sprockets 34. Take up means are preferably provided to keep the conveyor comparatively taut and in the form shown a weight 56 is used for this purpose, being carried by the lever 58, which is provided with sprockets 60 for engaging the conveyor chain on the return reach 36.

The passage of air through the oven is preferably in reverse direction as compared with the movement of the conveyor. A blower 70 is shown to take the fumes and smoke out through the conduit 74 and discharge same through stack 76, and the connection of conduit 74 is preferably made through the top wall of the oven near the conveyor inlet end. The travel of air through the oven is, of course, relatively slow, the blower being relied on principally to discharge smoke and fumes. If desired, inlet of air through the oven ends and particularly the conveyor inlet end may be closed during the burning off treatment, as by locating the loading station in a room with doors which can be closed, or other arrangements may be resorted to. An emergency stack 78 may be fitted to the oven near the highest point thereof, and is provided with a damper 80, which is normally closed, but may be opened more or less as occasion for its use may arise.

To operate the apparatus, a batch of high bake enameled metallic parts, such as fenders 62, engine hoods 64, and the like, are hung on the conveyor at the loading station 66, and power is turned on to operate the conveyor. Same is advanced to bring the parts loaded on at loading station 66 to the highest part or burning off station 14 of the oven 10, and the motion of the conveyor is arrested. A new batch of parts can now be loaded on the conveyor at the loading station 66.

After the enameled parts have been held at the burning off station 14 for a sufficient interval, usually about 20 minutes, the burning off is complete, whereupon the conveyor is advanced to bring the parts as 62, 64, from the burning off station 14 to the unloading station 68, and to bring a new batch of parts from the loading station 66 to the burning off station 14. When the parts are taken off at the unloading station 68, they are easily cleaned up with scratch brushes and the like and made ready for reenameling treatment.

It will be seen that my invention affords an extremely rapid, effective, inexpensive and easy mode of restoring the original metallic surface of the parts and of removing enamel, which being baked on at high temperatures is extremely resistant to ordinary treatment for coating removal, as by being passed through baths of paint remover and subjecting to scratching and similar operations for removal of the refractory coating.

I claim:

1. In apparatus for burning off high temperature baked enamel from metallic parts, an oven of the inverted V type having its low down end portions open and its intermediate portion elevated to form substantially a hot air pocket, means for supplying heat to the highest part of the oven for burning off the baked on enamel, and guards for the heaters adapted to protect the heaters from the dripping or flowing enamel and also to permit upward passage of air through the heaters into the oven.

2. In apparatus for burning off enamel from metallic parts baked thereon at high temperatures, an open ended oven of substantially inverted V form, means for supplying to the highest part of the oven heat sufficient for burning off the baked on enamel, guard plates for the heating means, said guard plates overlapping one another from above downward and having their overlapping portions separated to provide air passages for the upward movement of the heated air.

3. In apparatus for burning off baked on enamel from metallic parts, an oven having an elevated burning off station therein, means for supplying heat to said burning off station sufficient to burn off the enamel from the metallic parts, a conveyor traversing the said oven and also having reaches extending outward from the oven at the opposite ends thereof, a loading station for enameled parts adjacent to the inlet end of the oven, an unloading station for the burned off parts at the exit end of the oven, and means for drawing off fumes from the oven near the inlet end thereof.

4. In apparatus for burning off enamel from metallic parts baked thereon at high temperatures, an open ended oven of substantially inverted V form, means for supplying to the highest part of the oven heat sufficient for burning off the baked on enamel, guard plates for the heating means, said guard plates overlapping one another from above downward and having their overlapping portions separated to provide air passages for the upward movement of the heated air, and means for conveying the enameled parts through the oven.

In testimony whereof, I have signed my name hereto.

JNO. A. MILLER.